United States Patent
Craddock et al.

(10) Patent No.: US 9,880,942 B2
(45) Date of Patent: Jan. 30, 2018

(54) SELECTIVE PURGING OF PCI I/O ADDRESS TRANSLATION BUFFER

(71) Applicant: International Business Machines Corporation, Armonk, NY (US)

(72) Inventors: David F. Craddock, New Paltz, NY (US); Thomas A. Gregg, Highland, NY (US); Dan F. Greiner, San Jose, CA (US); Damian L. Osisek, Vestal, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/189,340

(22) Filed: Jun. 22, 2016

(65) Prior Publication Data

US 2016/0292082 A1 Oct. 6, 2016

Related U.S. Application Data

(63) Continuation of application No. 14/220,365, filed on Mar. 20, 2014.

(51) Int. Cl.
| | |
|---|---|
| *G06F 12/10* | (2016.01) |
| *G06F 12/1045* | (2016.01) |
| *G06F 12/1027* | (2016.01) |
| *G06F 12/1009* | (2016.01) |
| *G06F 13/42* | (2006.01) |

(52) U.S. Cl.
CPC ...... *G06F 12/1045* (2013.01); *G06F 12/1009* (2013.01); *G06F 12/1027* (2013.01); *G06F 13/4221* (2013.01); *G06F 2212/1016* (2013.01); *G06F 2212/152* (2013.01); *G06F 2212/303* (2013.01); *G06F 2212/65* (2013.01); *G06F 2212/651* (2013.01); *G06F 2212/657* (2013.01); *G06F 2212/683* (2013.01)

(58) Field of Classification Search
CPC ............ G06F 12/1027; G06F 12/1099; G06F 12/1081; G06F 2212/68; G06F 2212/683; G06F 2212/656; G06F 2212/681; G06F 13/42; G06F 13/4221; G06F 13/423
USPC ......... 711/207, 118, 135, 125, 127, E12.061
See application file for complete search history.

(56) References Cited

U.S. PATENT DOCUMENTS

| | | | |
|---|---|---|---|
| 7,716,673 B2 | 5/2010 | Chauvel et al. | |
| 2004/0230749 A1* | 11/2004 | Siegel | G06F 9/30047 711/144 |
| 2011/0320759 A1* | 12/2011 | Craddock | G06F 13/28 711/206 |
| 2013/0339657 A1 | 12/2013 | Greiner et al. | |

\* cited by examiner

*Primary Examiner* — Ann J Lo
*Assistant Examiner* — Tracy A Warren
(74) *Attorney, Agent, or Firm* — Cantor Colburn LLP

(57) ABSTRACT

A method of enhancing a refresh PCI translation (RPCIT) operation to refresh a translation lookaside buffer (TLB) includes determining, by a computer processor, a request to perform at least one RPCIT instruction for purging at least one translation from the TLB. The method further includes purging, by the computer processor, the at least one translation from the TLB in response to executing the at least one RPCIT instruction. The computer processor selectively performs a synchronization operation prior to completing the at least one RPCIT instruction.

1 Claim, 4 Drawing Sheets

SELECTIVE PURGING OF PCI I/O ADDRESS TRANSLATION BUFFER

DOMESTIC PRIORITY

This application is a continuation of U.S. patent application Ser. No. 14/220,365, filed Mar. 20, 2014, the disclosure of which is incorporated by reference herein in its entirety.

BACKGROUND

The present invention relates generally to peripheral-component-interconnect (PCI) interfaces, and more specifically, to selectively purge a PCI input/output (I/O) translation-lookaside buffer.

A peripheral-component-interconnect (PCI) interface may transfer data between main storage and the PCI function's storage by means of direct-memory-access (DMA) read/write requests. A DMA operation initiated by a PCI function may be targeted to one of several DMA address spaces in main storage. The PCI virtual address used by the DMA operation undergoes a dynamic address translation into an absolute address within the configuration to which the PCI function is attached. The I/O subsystem may provide a high-speed cache of past PCI address-translations, reducing the number of main-storage accesses needed to perform subsequent translations. Such a cache is generally referred to as a translation-lookaside buffer (TLB). During the life of a PCI DMA address space, translation parameters (e.g., region-table entries, segment-table entries, and page table entries) used by the PCI address-translation mechanism may need to be altered by the operating system. However, since the I/O subsystem may have cached translation parameters used in past translations, the operating system is required to purge any TLB entries corresponding to the altered translation table entries.

Conventional operating systems utilize a refresh PCI translation (RPCIT) instruction to purge any TLB entries that were formed from translation tables and their entries. After altering a translation table used by a PCI function, the operating system may execute the RPCIT instruction to purge any cached TLB information from past translations. However, the length of the PCI virtual address range to which the purge applies does not necessarily have to reflect the true length of the underlying translation parameters in the TLB. In addition to an I/O TLB purging operation, the RPCIT instruction is currently defined to initiate an operation known as PCI synchronization. When executing the conventional RPCIT instructions, a combination of firmware and hardware are forced to execute the PCI synchronization after performing each refresh operation.

SUMMARY

Embodiments relate to enhancing a refresh PCI translation (RPCIT) instruction to refresh a translation lookaside buffer (TLB). A computer processor determines a request to purge a translation for a single frame of the TLB in response to executing an enhanced RPCIT instruction. The enhanced RPCIT instruction is configured to selectively perform one of a single-frame TLB refresh operation or a range-bounded TLB refresh operation. The computer processor determines an absolute storage frame based on a translation of a PCI virtual address in response to the request to purge a translation for a single frame of the TLB. The computer processer further performs the single-frame TLB refresh operation to purge the translation for the single frame.

According to another embodiment, a method, system, and computer program product for enhancing a refresh PCI translation (RPCIT) instruction that includes a synchronization bypass (SB) control bit field in the first register identified by the first-register sub-block of the RPCIT instruction block to control a synchronization of the refresh operation. The synchronization is omitted after completing the refresh operation in response to enabling the SB control bit field, and is performed after completing the refresh operation in response to disabling the SB control bit field.

According to another embodiment, a method, system, and computer program product for enhancing a refresh PCI translation (RPCIT) instruction includes communicating a PCI command response block indicating that at least one of the SF control bit field and the SB control bit field is installed in the RPCIT instruction block based on a PCI command request block.

According to another embodiment, a method, system and computer program product for enhancing a refresh PCI translation (RPCIT) operation to refresh a translation lookaside buffer (TLB) includes determining, by a computer processor, a request to perform at least one RPCIT instruction for purging at least one translation from the TLB. The method further includes purging, by the computer processor, the at least one translation from the TLB in response to executing the at least one RPCIT instruction. The computer processor selectively performs a synchronization operation prior to completing the at least one RPCIT instruction.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

According to an embodiment, an enhanced RPCIT instruction block provides a feature of selectively purging PCI input/output (I/O) translation-lookaside buffers. The enhanced RPCIT instruction block includes a first register field ($R_1$) and a second register field ($R_2$). A first register designated by the first register field $R_1$ includes a single-frame (SF) control bit field to selectively initiate a SF control operation that selectively purges a single frame of a PCI input/output (I/O) translation-lookaside buffer (TLB). The second register field $R_2$ field designates an even-odd pair of general registers, comprising the second operand, and designates an even-numbered register. The second operand designates the range of PCI virtual addresses within a direct memory access (DMA) address space to which the SF control operation applies. Bit positions 0-63 of the even-numbered register, general register $R_2$, contain the beginning PCI virtual address. The PCI virtual address includes the DMA address space selector to which the operation applies. When the SF control bit field is not initiated (e.g., set to "0"), bit positions 0-63 of the odd-numbered register, general register ($R_2$+1), contain an unsigned 64-bit integer specifying the number of bytes in the PCI virtual address range to which the operation applies. When the SF control bit field is initiated (e.g., set to "1"), the number of bytes to which the operation applies is assumed to be the size of the frame resulting from the translation of the PCI virtual address in general register $R_2$. Also, the firmware and/or hardware executing the instruction does not need to determine the page/frame size associated with this operation.

Figure 1:
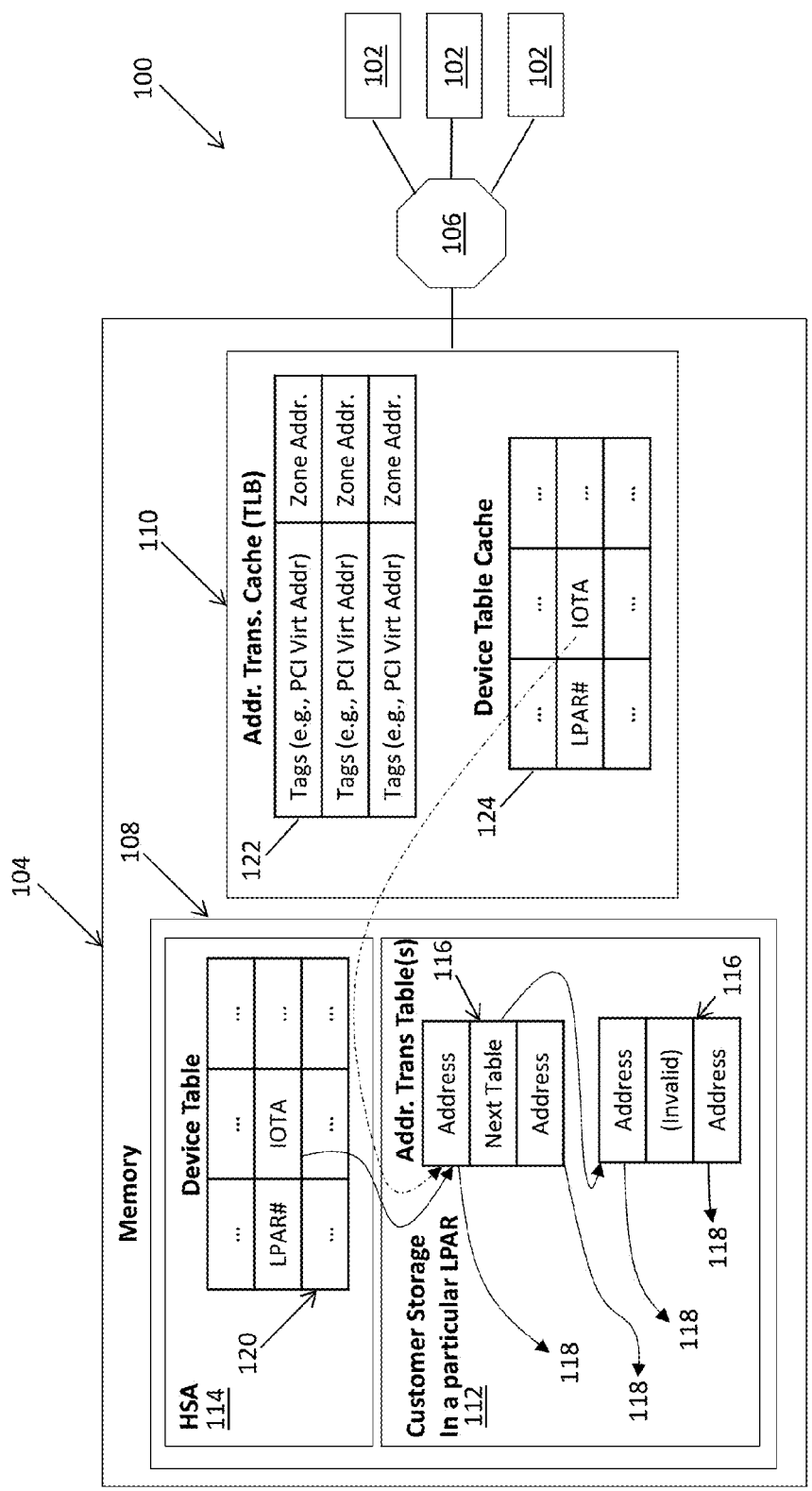
FIG. 1 depicts a computer system environment in accordance with an embodiment.

Turning now to FIG. 1, a computer system 100 is generally shown according to an exemplary embodiment. The computer system 100 includes one or more PCI adapters 102 in electrical communication with a computer processor 104. The PCI adapters 102 may contain one or more PCI functions (e.g., PCI devices). The PCI adapters 102 may communicate with the computer processor 104 via a switch 106, such as a PCI Express (PCIe) switch. Although a single switch 106 is illustrated, it is appreciated that multiple switches may be included in the computer system 100. The PCI adapters 102 are configured to request access to a DMA address space in connection with a read and/or write (read/write) operation. The request may be routed over PCI or analogously over PCIe to the computer processor 104 via the switch 106 as understood by one of ordinary skill in the art.

The computer processor 104 comprises a memory unit 108 and a host bridge module 110. The memory unit 108 includes a customer-accessible storage area (CSA) 112 and a protected hardware-storage area (HSA) 114. The CSA 112 may comprise one or more logical partitions (LPARs). Although the CSA 112 is illustrated having a single LPAR, it is appreciated that the CSA 112 may include multiple LPARs. The LPAR stores one or more address translation tables 116. Each address translation table 116 maps one or more virtual addresses to respective blocks of absolute data storage, i.e., data storage blocks 118 as understood by one of ordinary skill in the art. The data storage blocks 118 may comprise blocks of various storage page or frame sizes. For example, a virtual address is generally broken into pages, segments, and, when necessary, regions. The underlying block(s) of real or absolute storage to which the virtual address translates is referred to as a frame (or page frame, segment frame, and region frame).

The HSA 114 is a storage area of memory in which the device table 120 resides. Firmware executed by the computer processor 104 stores data into the device-table entries. For example, the device table 120 lists one or more input/output translation anchors (IOTAs), each of which points to a series of one or more address translation tables stored in a corresponding LPAR. The HSA 114 is accessible by firmware of the computer processor 104. In this regard, the computer processor 104 determines which particular data storage blocks 118 correspond to a respective virtual address mapped through the address translation tables 116.

The host bridge module 110 bridges a PCI interface with a memory bus installed in the computer processor 104. In this regard, the host bridge module 110 allows the PCI adapters 102 and the memory unit 108 to communicate with one another. The host bridge module 110 includes one or more PCI input/output (I/O) translation-lookaside buffers (TLB) 122 and one or more device table caches (DTC) 124. According to an embodiment, the host bridge module 110 directly accesses each TLB 122. The TLB 122 is a high-speed cache of previous PCI address-translations, which allows for reducing the number of main-storage accesses needed to perform subsequent translations. The DTC 124 may include various selected entries corresponding to a PCI function associated with a respective PCI adapter 102. In this regard, the TLB 122 and the DTC 124 are utilized by a dynamic memory access (DMA) operation to translate a PCI virtual address into an absolute address corresponding to a PCI function associated with the respective PCI adapter 102 as understood by one of ordinary skill in the art. The computer processor 104 may dynamically update the translation tables 116 based on various system needs. As a result, the TLB 122 must be refreshed and previously cached translation entries (i.e., TLB entries) are purged.

A PCI adapter 102 may request data stored in one or more data storage blocks 118 which correspond to the PCI function associated with the PCI adapter 102. When requesting the data from the storage blocks 118, the PCI adapter 102 communicates a direct memory access (DMA) message to the host bridge 110 via the switch 106. The DMA message includes an anticipated virtual address and a request identifier (RID). The anticipated virtual address is generated by the PCI function associated with the PCI adapter 102. The resource identification value (RID) is utilized as an index into the device table 120, to obtain a device table entry that contains the IOTA. The IOTA in turn indicates the proper set of address translation tables 116 including the mapping of the virtual address to the data storage block 118 sought by the PCI adapter 102. Accordingly, the anticipated virtual address may be translated into an absolute address associated with a respective data storage block 118.

Figure 2:
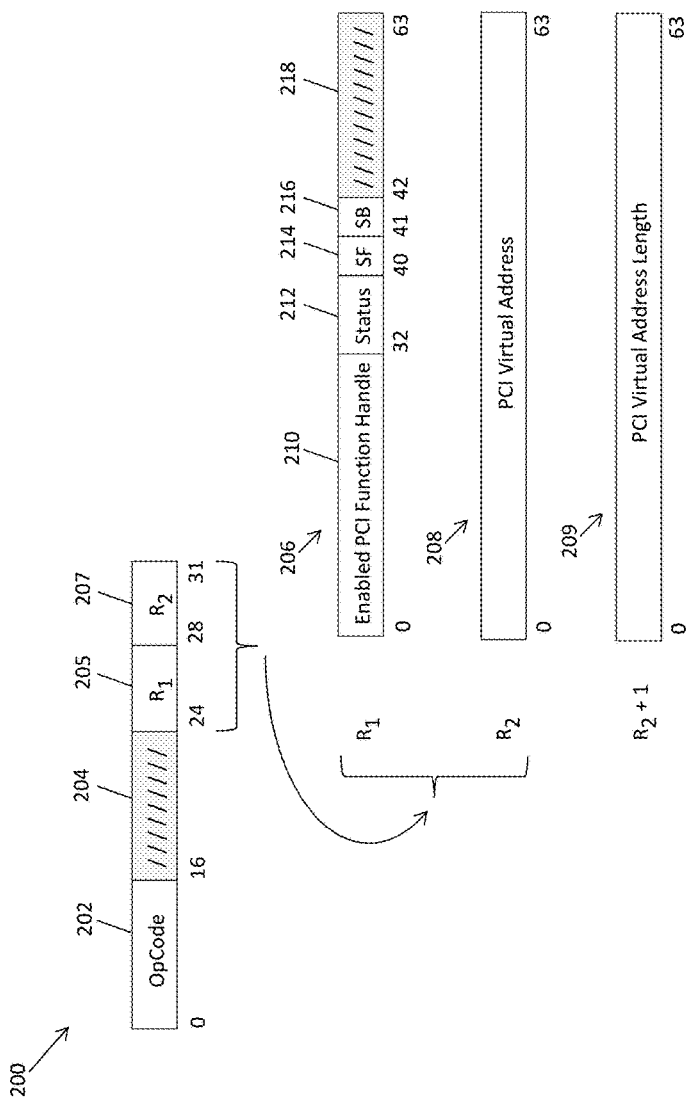
FIG. 2 illustrates an enhanced RPCIT instruction block in accordance with an embodiment.

Turning now to FIG. 2, an enhanced RPCIT instruction block 200 configured to execute a RPCIT refresh operation for selectively purging a TLB 122 is illustrated. The enhanced RPCIT instruction block 200 is configured to selectively purge a single frame, for example, from the TLB 122 regardless of any length specified in the instruction. The enhanced RPCIT instruction block 200 includes an operation code sub-block 202, an unused bit sub-block 204, a first register number sub-block ($R_1$) 205 designating a first register ($R_1$) 206, and a second register number sub-block ($R_2$) 207 designating a second register ($R_2$) 208. The operation code sub-block 202 designates the operation to be performed by the processor, in this case, a refresh-PCI-translations operation. The unused bit sub-block 204 are reserved and should contain zeros.

The first register number sub-block ($R_1$) 205 of the instruction block 200 designates a first register ($R_1$) 206 which includes bit positions that selectively initiate a single-frame (SF) purging operation and a synchronization bypass (SB) operation. More specifically, the first register ($R_1$) 206 comprises 64 bit positions, which may be divided into a plurality of fields. A first field 210 comprises bit positions 0-31 for indicating an enabled handle of the PCI function. A second field 212 comprises bit positions 32-39 for indicating a status code field that is applicable when a particular condition code occurs in response to completing the RPCIT instruction. According to one embodiment, the second field 212 remains unchanged when the RPCIT instruction is completed without the occurrence of the particular condition code. A single-frame (SF) control bit field 214 exists at bit position 40 and initiates the selective SF purging operation of the TLB 122 as discussed in greater detail below. A synchronization-bypass (SB) control bit field 216 exists at bit position 41 and initiates a synchronization bypass operation which is discussed in greater detail below. A remaining field 218 contains bits that fill the remaining bit positions 42-63. For example, the bits of the remaining field 218 may all be set to "0" to provide future operation capabilities.

The second register number sub-block ($R_2$) 207 of the instruction block 200 designates an even-numbered general register, that is, second register ($R_2$) 208, of an even/odd pair of general registers. Bit positions 0-63 of the second register ($R_2$) 208 contain the beginning PCI virtual address. The PCI virtual address includes the DMA address space selector to which the operation applies. Accordingly to an embodiment, the second register number sub-block ($R_2$) 207 designates an even-numbered register, otherwise a specification exception is determined.

As further illustrated in FIG. 2, the second register number sub-block ($R_2$) 207 may also designate an odd-numbered general register, that is, general register ($R_2$+1) 209. According to an embodiment, the general register ($R_2$+1) 209 includes 64 bit positions that designate a PCI virtual address length. The data included in the general register ($R_2$+1) 209 may be used to perform a range-bounded refresh operation that purges multiple-addresses in the TLB 122.

The SF purging operation is configured to selectively purge a PCI virtual address (e.g., a single frame) indicated by the second register ($R_2$) 208 based on the bit value of the SF control bit field 214. More specifically, the selective SF purging operation is not initiated when the RPCIT SF control bit field 214 is set to "0", for example. In this mode, the TLB is purged according to the original (unenhanced) RPCIT instruction. However, bit positions 0-63 of general register ($R_2$+1) 209 contain an unsigned 64-bit integer specifying the number of bytes in the PCI virtual address range to which the purging operation applies. This may result in either all entries associated with the length specified being purged, or alternatively all entries associated with the entire DMA address space being purged.

When the SF control bit field 214 is set to "1", for example, the selective SF purging operation is initiated, and the number of bytes to which the operation applies is assumed to be the size of the frame resulting from the translation of the PCI virtual address in the second register field ($R_2$) 208. In this mode, the SF selective purging operation ignores the contents of general register ($R_2$+1) 209. Accordingly, the refresh operation is applied to only the PCI virtual addresses resulting in translation to the single underlying absolute frame of storage. Because the address of the absolute frame is on an integral boundary corresponding to its size, address wrap-around is not possible. In addition the DMA address space may comprise multiple page/frame sizes, and this selective purging avoids the processing associated with determining the page/frame size corresponding to the address and length specified in the instruction. Accordingly, the TLB 122 is purged more efficiently.

The conventional RPCIT instruction purges, or, in the case of the program specified I/O TLB model, re-buffers, translations for addresses from the TLB 122 as designated by the second operand. Additionally, the conventional RPCIT instruction is required to perform a synchronization operation after completing each RPCIT instruction. The synchronization operation requires the execution of a synchronization at the end of each RPCIT refresh operation, following all the purges specified by the respective refresh operation. This synchronization requires communication with the host bridge 110, and ordering of requests by the host bridge 110, which can take a significant amount of time. With respect to the enhanced RPCIT instruction block 200, however, the corresponding enhanced RPCIT instruction may selectively perform a synchronization bypass operation which bypasses the conventional synchronization operation, thus improving performance. Therefore, the corresponding enhanced RPCIT instruction does not necessarily require a confirmation after purging the specified TLB entries.

More specifically, when the SB control bit field 216 is set to "0", for example, the enhanced RPCIT instruction performs a synchronization operation. In this mode, the enhanced RPCIT instruction does not complete until at least (a) the host bridge 110 completes any storage accesses (including the updating of reference and change bits) using the TLB entries of the TLB 122, and (b) the host bridge 110 completes any storage accesses using TLB entries of the TLB 122 corresponding to PCI virtual addresses in previous RPCIT instructions during which the SB control bit field 216 is set to "1". Thus, when refresh initiated by the enhanced RPCIT instruction completes, none of the former I/O TLB entries associated with the PCI function (i.e., PCI device) will be used for either (a) the range of PCI virtual addresses designated by this execution of the instruction, or (b) any and all of the PCI function's virtual addresses specified in previous executions of enhanced RPCIT instruction in which the SB control bit field 216 was set to "1".

When, however, the SB control bit field 216 is set to "1", for example, the enhanced RPCIT instruction bypasses the synchronization operation. In this case, the enhanced RPCIT instruction does not necessarily wait for the storage accesses of the corresponding PCI function to complete. Accordingly to an embodiment, a program running on the computer processor 104 may selectively activate the SB operation (i.e., set the SB control bit field 216 to "1") or deactivate the SB operation (i.e., set the SB control bit field 216 to "0"). In this regard, the enhanced RPCIT instruction achieves an increased speed when the program sets the SB control bit field 216 to "1" of each enhanced RPCIT instruction block 200 utilized in a series of refresh operations, except for the final refresh operation of the series where the SB control should be set to zero to ensure that all preceding refresh operations to the designated PCI virtual address(es) have completed.

According to another embodiment, the computer processor 104 allows for a running program to determine whether the SF control bit field 214 (i.e., the SF selective purging operation) and/or the SB control bit field 216 (i.e., the SB operation) are installed. More specifically, a program running on the computer processor 104 determines whether the SF control bit field 214 and/or the SB control bit field 216 are installed by analyzing a query-PCI-function-group command-response block, hereinafter referred to as a PCI command response block.

Figure 3:
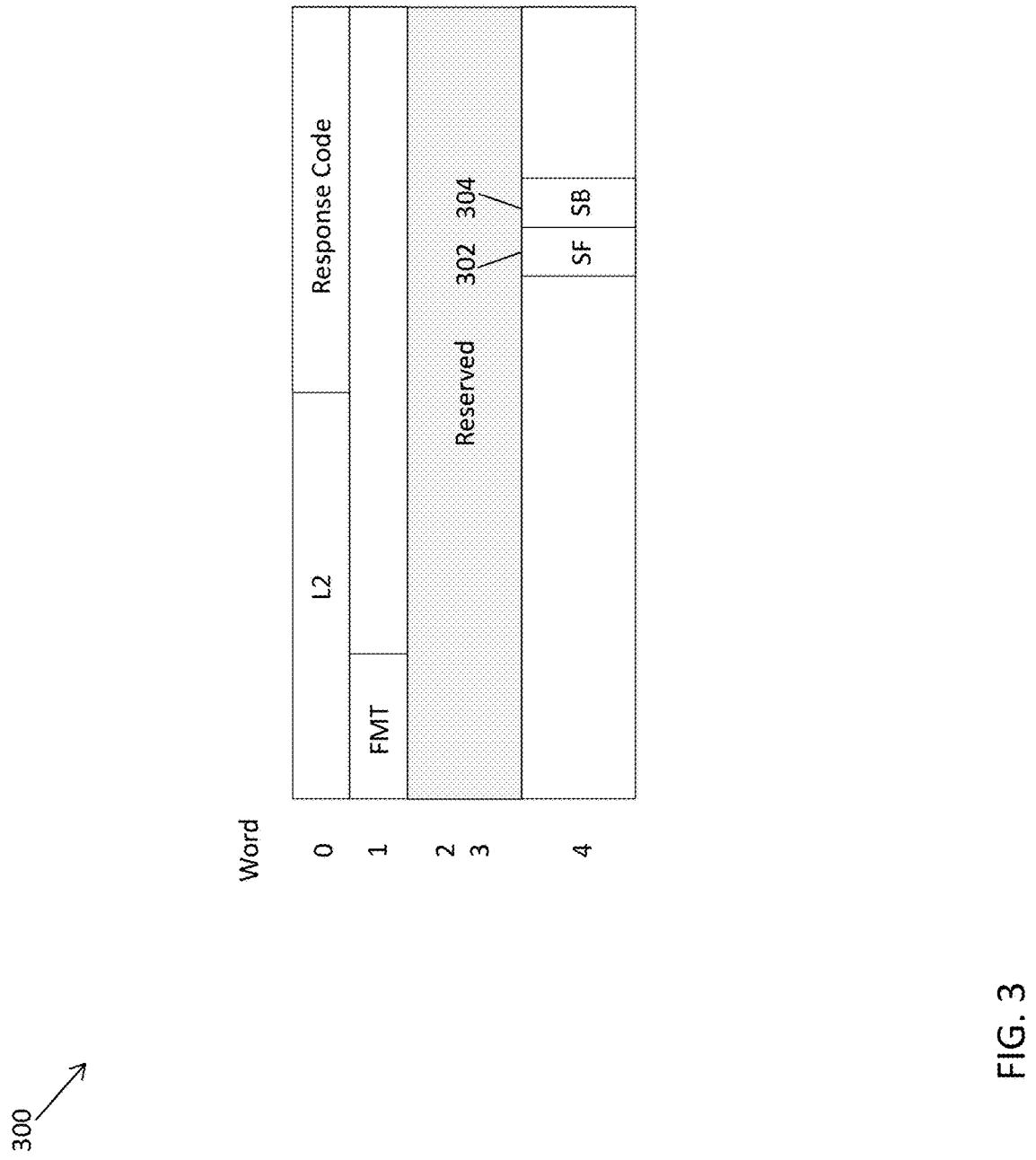
FIG. 3 illustrates an enhanced PCI command response block in accordance with an embodiment.

Referring to FIG. 3, a PCI command response block 300 output by the computer processor 104 is illustrated according to an exemplary embodiment. The PCI command response block 300 includes a SF operation indication bit field 302 and a SB operation indication bit field 304. According to an embodiment, the SF operation indication bit field 302 is installed in the PCI command response block 300 at bit 24 of word 4 and the SB operation indication bit field 304 is installed at bit 25 of word 4. A program running on the computer processor 104 may receive the PCI command response block 300 in response to sending a request such as, for example, a PCI command request block corresponding to a query-PCI-function group CLP command. The program analyzes the bit status of the SF operation indication bit field 302 to determine whether the SF selective purging operation is available for use, and analyzes the bit status of the SB operation indication bit field 304 to determine whether the SB operation is available for use.

According to an embodiment, the program determines that the SF control bit field 214 is installed in the enhanced RPCIT instruction block 200 when the SF operation indication bit field 302 is set to "1". The program may then set the SF control bit field 214 to "1" and identify a single frame, for example, to be purged instead of purging the entire TLB 122. If the SF operation indication bit field 302 is set to "0", the program determines that the SF control bit field 214 is not installed. In this case, the TLB 122 is refreshed by purging entries based on the data of general register $R_2+1$ 209, for example.

In another embodiment, the program determines that the SB control bit field 216 is installed in the enhanced RPCIT instruction block 200 when the SB operation indication bit field 304 is set to "1". The program may then selectively set the SB control bit field 216 to "1" to bypass the synchronization operation following completion of one or more RPCIT instructions. For example, the program may set the SB control bit field 216 to "1" for every refresh operation in a series of executed RPCIT instructions, except for the final refresh operation. As a result, the synchronization operation will be executed only after completing the refresh operation of the final RPCIT instruction. If, however, the SB operation indication bit field 304 is set to "0", the program determines that the SB control bit field 216 is not installed. In this case, a synchronization operation is executed after the completion of a refresh operation of each executed RPCIT instruction among a series of executed RPCIT instructions. According to an embodiment, if a program specifies a nonzero SF or SB control in the RPCIT instruction, but the single-frame refresh operation or synchronization bypass operation is not available on the processor, the program will still operate compatibly. For example, in the case where SF=1, but the processor does not support the single-frame facility, a selective purge does not occur. Instead a conventional range-bounded purging operation (i.e., an un-enhanced RPCIT instruction) will be executed. The program may set general register $R_2+1$ 209 to the size of a single frame to ensure compatible behavior. Similarly, in the case where SB=1, but the processor doesn't support the synchronization bypass operation, a synchronization will be performed at the end of each RPCIT refresh operation, following all the purges specified by the respective refresh operation.

Figure 4:
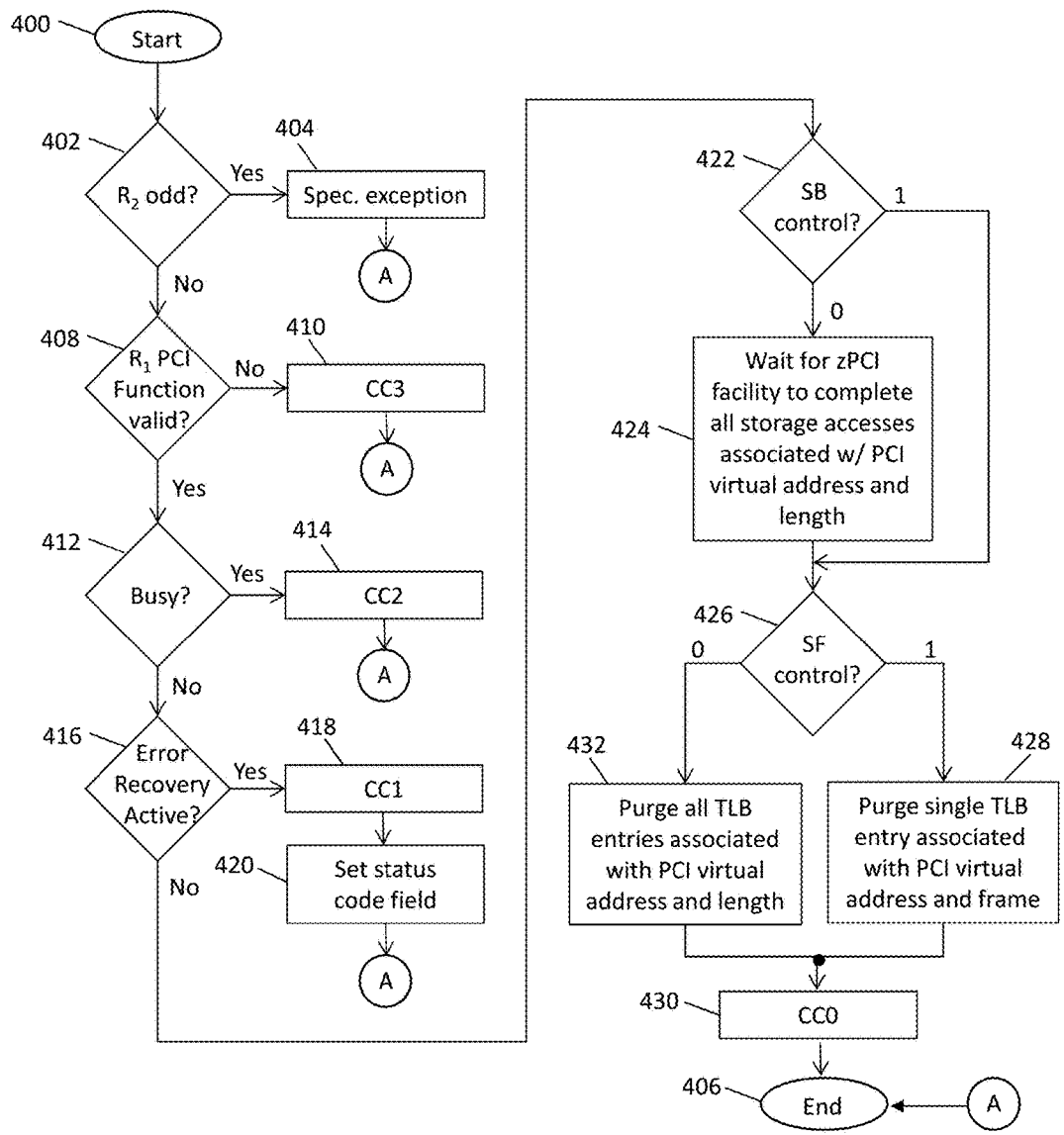
FIG. 4 is a flow diagram illustrating a method of enhancing a RPCIT instruction in accordance with an embodiment.

Turning now to FIG. 4, a flow diagram illustrates a method of enhancing a RPCIT function in accordance with an embodiment. The method begins at operation 400 and proceeds to operation 402 where a determination is made as to whether the second register number sub-block $R_2$ 207 is odd. If the second register number sub-block $R_2$ 207 is odd, a specification exception is determined at operation 404 and the method ends at operation 406.

If the second register number sub-block $R_2$ 207 is not odd (i.e., is even), a determination is performed at operation 408 as to whether the PCI function, for example, associated with the enabled PCI function handle contained in the first register $R_1$ 206, as selected by the first register number sub-block $R_1$ 205, is valid. If the PCI function is not valid, a condition code 3 (CC3) is determined at operation 410 and the method ends at operation 406. According to an embodiment, the CC3 indicates an unrecognized handle.

If the PCI function is determined to be valid at operation 408, the method proceeds to operation 412 where a determination is made as to whether the valid PCI function is busy. If the valid PCI function is busy, a condition code 2 (CC2) is determined at operation 414 and the method ends at operation 406.

When the PCI function is not busy at operation 412, the method proceeds to operation 416 and determines whether an error recovery process is active. If the error recovery process is active, a condition code 1 (CC1) is determined at operation 418. At operation 420, a status code field of the first register $R_1$ 206 is filled with bits indicating an error condition has occurred, and the method ends at operation 406. If, however, an error recover process is not active at operation 416, the method analyzes a SB control as discussed in greater detail below.

Turning to operation 422, if the SB control bit field 216 of the first register $R_1$ 206 is set to "1", for example, the SB control is determined as being activated and a synchronization following the refresh operation associated with the RPCIT instruction is not performed (i.e., bypassed). In this regard, the method proceeds to operation 426 without waiting for a computer processor communicating with a PCI adapter to complete all storage accesses associated with the specified PCI virtual addresses. If, however, the SB control bit field 216 of the first register $R_1$ 206 is set to "0", for example, the SB control is determined as being deactivated. Accordingly, a synchronization following the refresh operation associated with the RPCIT instruction is performed at operation 424 before proceeding to operation 426. The synchronization includes waiting for a computer processor communicating with a PCI adapter to complete all storage accesses associated with a PCI virtual address and length before executing the next RPCIT instruction in a series of RPCIT instructions.

Turning now to operation 426, if the SF control bit field 216 of the first register $R_1$ 206 is set to "1", for example, the SF control is determined as being activated. At operation 428 a selective purging operation of a TLB is performed based on the SF control operation. At operation 430, a condition code 0 (CC0) is determined, and the method ends at operation 406. According to an exemplary embodiment, the CC0 indicates a normal completion of the refresh operation. Therefore, when the SF control bit is set to one, the refresh operation selectively purges, for example, a single TLB entry associated with a PCI address and frame.

If, however, the SF control bit field 216 of the first register $R_1$ 206 is set to "0", for example, the SF control is determined as being deactivated. At operation 432, a range-bounded purging operation of the TLB is performed. At operation 430 the CC0 is determined, and the method ends at operation 406. The range-bounded purging operation includes, for example, purging all TLB entries associated with a PCI virtual address and length and/or all TLB entries associated with a particular PCI function and/or PCI device.

As described in detail above, at least one embodiment provides an enhanced RPCIT instruction block including a SF control bit field that selectively enables purging of only a single frame of storage (of the size cached in the TLB). Accordingly, performance of the TLB refresh operation may be improved. In addition to the SF control bit field, the enhanced RPCIT instruction block includes a SB control bit field that selectively enables a bypass of the PCI synchronization operation. Selectively bypassing the synchronization operation when performing a sequence of RPCIT instructions, for example, may be improve system performance and overall system operating speed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of improving efficiency of a refresh operation on a translation lookaside buffer (TLB) using an enhanced refresh PCI translation (RPCIT) instruction to refresh a translation lookaside buffer (TLB), the method comprising:

analyzing, via a computer processor, a PCI command response block including at least one of a single-frame (SF) control bit field and a synchronization bypass (SB) control bit field;

determining, via the computer processor, a single-frame TLB refresh operation is available based on a SF control bit existing in the SF control bit field;

in response to detecting that the SF control bit indicates that the single-frame TLB refresh operation is available, determining, by the computer processor, a request to purge a translation for a single frame of the TLB in response to executing an enhanced RPCIT instruction configured to selectively perform one of the single-frame TLB refresh operation and a range-bounded TLB refresh operation;

determining, by the computer processor, an absolute storage frame based on a translation of a PCI virtual address in response to the request to purge a translation for a single frame of the TLB;

performing, by the computer processor, the single-frame TLB refresh operation to purge the translation for the single frame; and in response to detecting that the SF control bit indicates that the single-frame TLB refresh is unavailable, performing a range-bound refresh operation to purge multiple-addresses in the TLB.

\* \* \* \* \*